United States Patent
Wiedeman et al.

(10) Patent No.: US 6,661,996 B1
(45) Date of Patent: Dec. 9, 2003

(54) SATELLITE COMMUNICATION SYSTEM PROVIDING MULTI-GATEWAY DIVERSITY TO A MOBILE USER TERMINAL

(75) Inventors: Robert A Wiedeman, Los Altos, CA (US); Paul A Monte, San Jose, CA (US)

(73) Assignee: Globalstar L.P., San Jose, CA (US)

( * ) Notice: Subject to any disclaimer, the term of this patent is extended or adjusted under 35 U.S.C. 154(b) by 0 days.

(21) Appl. No.: 09/114,985

(22) Filed: Jul. 14, 1998

(51) Int. Cl.$^7$ .................. H04B 7/185; H04Q 7/20
(52) U.S. Cl. .............. 455/12.1; 455/430; 455/428
(58) Field of Search ........................... 455/427, 428, 455/442, 13.1, 13.2, 12.1, 429, 554, 405, 407, 408, 8, 9, 430; 375/130

(56) References Cited

U.S. PATENT DOCUMENTS

| | | | |
|---|---|---|---|
| 3,590,380 A | 6/1971 | Zegers et al. ............. 325/13 |
| 3,798,544 A | 3/1974 | Norman .................. 325/38 A |
| 4,613,990 A | 9/1986 | Halpern .................... 455/33 |

(List continued on next page.)

FOREIGN PATENT DOCUMENTS

| EP | 0 421 698 A2 | 10/1991 | |
|---|---|---|---|
| EP | 0 536 033 A2 | 9/1992 | ........... H04B/7/195 |
| EP | 0 849 890 A2 | 6/1998 | ........... H04B/7/185 |
| EP | 0 973 274 A2 * | 1/2000 | ........... H04B/7/185 |
| WO | WO 90/13186 | 11/1990 | |
| WO | WO 91/09473 | 6/1991 | |
| WO | WO 92/21196 | 11/1992 | |
| WO | WO 93/10609 | 5/1993 | |
| WO | 98/02011 | * 1/1998 | ........... H04Q/7/38 |

OTHER PUBLICATIONS

US 5,415,368, 5/1995, Horstein et al. (withdrawn)
European Search Report, dated Jul. 26, 2001 for EP 99 30 4681.
Petition of American Mobile Satellite Corporation Before the FCC, Washington, DC 20554, dated Jun. 3, 1991, pp. 1–15.

(List continued on next page.)

*Primary Examiner*—Charles Appiah
(74) *Attorney, Agent, or Firm*—Ohlandt, Greeley, Ruggerio & Perle, LLP

(57) ABSTRACT

Disclosed herein is a method for operating a satellite communications system as well as a method for providing a larger effective gateway coverage area, and a system that operates in accordance with the methods. The methods include steps of (a) establishing a call connection between a terrestrial telecommunications network and a user terminal via a first gateway and at least one satellite; and (b) while the call connection is established, coupling the user terminal to the terrestrial telecommunications network via a second gateway and at least one further satellite. The step of coupling includes a step of conveying call speech or data information between the first gateway and the second gateway over an inter-gateway communications link. By so linking multiple gateways each gateway experiences an increase in its effective coverage area, as an on-going call can be continued even after a user terminal moves from a first gateway's coverage area into a second gateway's coverage area.

23 Claims, 8 Drawing Sheets

U.S. PATENT DOCUMENTS

| | | | | |
|---|---|---|---|---|
| 4,617,674 A | | 10/1986 | Mangulis et al. | 375/111 |
| 4,639,937 A | | 1/1987 | McRae et al. | 375/267 |
| 4,670,885 A | | 6/1987 | Parl et al. | 375/1 |
| RE32,905 E | | 4/1989 | Baran | 370/104 |
| 4,901,307 A | | 2/1990 | Gilhousen et al. | 370/18 |
| 4,905,221 A | | 2/1990 | Ichiyoshi | 370/18 |
| 4,914,699 A | | 4/1990 | Dunn et al. | 380/34 |
| 4,993,044 A | | 2/1991 | Akazawa | 375/1 |
| 5,010,317 A | | 4/1991 | Schwendeman et al. | 340/311.1 |
| 5,056,109 A | | 10/1991 | Gilhousen et al. | 375/1 |
| 5,073,900 A | | 12/1991 | Mallinckrodt | 375/1 |
| 5,081,703 A | | 1/1992 | Lee | 455/13 |
| 5,093,840 A | | 3/1992 | Schilling | 375/1 |
| 5,101,501 A | * | 3/1992 | Gilhousen et al. | 455/442 |
| 5,103,459 A | | 4/1992 | Gilhousen et al. | 375/1 |
| 5,109,390 A | | 4/1992 | Gilhousen et al. | 375/1 |
| 5,119,225 A | | 6/1992 | Grant et al. | 359/172 |
| 5,129,098 A | | 7/1992 | McGirr et al. | 455/69 |
| 5,132,985 A | | 7/1992 | Hashimoto et al. | 375/1 |
| 5,172,375 A | * | 12/1992 | Kou | 370/322 |
| 5,204,970 A | | 4/1993 | Stengel et al. | 455/69 |
| 5,216,427 A | | 6/1993 | Yan et al. | 342/352 |
| 5,233,626 A | | 8/1993 | Ames | 375/1 |
| 5,239,671 A | | 8/1993 | Linquist et al. | 455/13.1 |
| 5,265,119 A | | 11/1993 | Gilhousen et al. | 375/1 |
| 5,267,261 A | * | 11/1993 | Blakeney, II et al. | 370/332 |
| 5,280,472 A | | 1/1994 | Gilhousen et al. | 370/335 |
| 5,303,286 A | | 4/1994 | Wiedeman | 379/59 |
| 5,305,349 A | | 4/1994 | Dent | 370/209 |
| 5,339,330 A | | 8/1994 | Mallinckrodt | 375/1 |
| 5,410,728 A | | 4/1995 | Bertiger et al. | 455/13.1 |
| 5,416,797 A | | 5/1995 | Gilhousen et al. | 375/209 |
| 5,422,647 A | * | 6/1995 | Hirshfield et al. | 342/354 |
| 5,433,726 A | | 7/1995 | Horstein et al. | 244/158 R |
| 5,439,190 A | | 8/1995 | Horstein et al. | 244/158 R |
| 5,446,756 A | | 8/1995 | Mallinckrodt | 375/200 |
| 5,448,623 A | | 9/1995 | Wiedeman et al. | 379/59 |
| 5,537,679 A | | 7/1996 | Crosbie et al. | 455/132 |
| 5,548,292 A | * | 8/1996 | Hirshfield et al. | 342/354 |
| 5,548,808 A | * | 8/1996 | Bruckert et al. | 455/442 |
| 5,559,790 A | * | 9/1996 | Yano et al. | 370/342 |
| 5,574,968 A | * | 11/1996 | Olds et al. | 455/428 |
| 5,592,481 A | | 1/1997 | Wiedeman et al. | 370/316 |
| 5,619,525 A | | 4/1997 | Wiedeman et al. | 375/200 |
| 5,634,190 A | * | 5/1997 | Wiedeman | 455/13.1 |
| 5,664,006 A | | 9/1997 | Monte et al. | 370/320 |
| 5,862,480 A | * | 1/1999 | Wild et al. | 455/13.1 |
| 5,903,554 A | * | 5/1999 | Saints | 370/342 |
| 5,963,870 A | * | 10/1999 | Chheda et al. | 455/522 |
| 6,058,115 A | * | 5/2000 | Sawyer et al. | 370/401 |
| 6,128,488 A | * | 10/2000 | Sauvageot et al. | 455/428 |
| 6,233,456 B1 | * | 5/2001 | Schiff et al. | 455/436 |

OTHER PUBLICATIONS

Application of Motorola Satellite Communications, Inc. for Iridium A Low Earth Orbit Mobile Satellite System before the FCC, Washington, D.C. Dec. 1990, pp. 49–96.

Before the FCC, Washington, D.C. 20554, Aries Constellation Low Earth Orbit Satellite System Proposal of Constellation Communications, Inc. Jun. 3, 1991, Appendix A, B, and C.

Application of TRW Inc. for Authority to Construct a New Communications Satellite System Odyssey before the FCC, Washington, D.C. 20554, May 31, 1991 pp. 33–51.

A portion of FCC Application of Ellispsat Corporation, Nov. 2, 1990, pp. 1–17.

A portion of FCC Application of Loral Cellular Systems, Corp., Jun. 3, 1991, pp. 1–186.

R. Price et al., "A Communication Technique For Multi–Path Channels", Proceedings of the IRE, Mar. 1958, pp. 555–570.

K. Gilhousen et al., "Increased Capacity Using CDMA for Mobile Satellite Communication", IEEE Journal on Selected Areas in Communications, vol. 8, No. 4, May 4, 1990, pp. 503–514.

J. Spilker, "Digital Communicaitons By Satellite", Coherent and Differentially Coherent Transmission Techniques, pp. 303–310.

"Software Implementation of a PN Spread Spectrum Receiver To Accommodate Dynamics" IEEE Transactions on Communications, vol. COM 25. No. 8, Aug. 1977, pp. 832–840.

"Current and Future Mobile Satellite Communication Systems", S. Kato et al. IEICE Transactions, vol. E 74, No. 8 Aug. 1991.

"Iridium*: Key to Worldwide Cellular Communications", J. Foley, Telecommunicaitons, Oct. 1991, pp. 23–28.

"An Integrated Satellite–Cellular Land Mobile System for Europe", E. Del Re University of Florence, Dept. of Electronics Engineering, Italy, Sep. 21, 1989.

"The Iridium[1] System—A Revolutionary Satellite Communications System Developed with Innovative Applications of Technology", D. Sterling et al., IEEE, Nov., 1991.

"Digital Network Oriented Mobile Radio Satellite System as an Integrated Part of the GSM Cellular Radio System in Europe", P. Dondl, Deutsch Bundespost/Fernmeldetechniches Zentralamt/Darmstadt, Fed. Rep. of Germany, Sep. 21, 1989.

"The OmniTRACS® Mobile Satellite Communications and Positioning System", E. Tiedemann, Jr. et al., Vehicle Electronics in the 90's: Proceedings of the International Congress on Transportation Electronics, Oct. 1990.

* cited by examiner

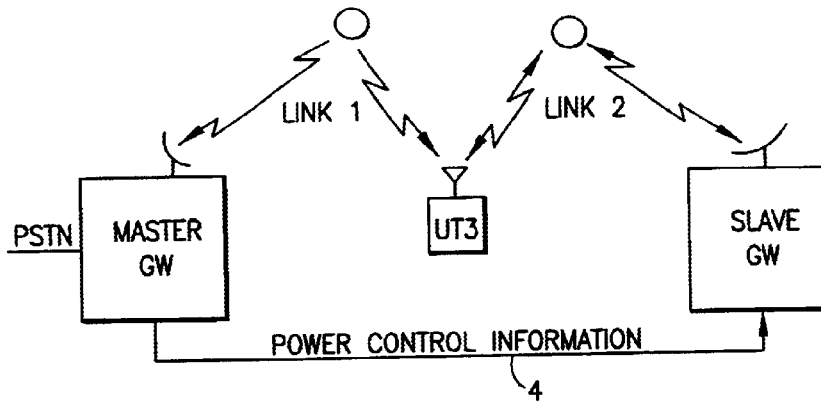
FIG.6A
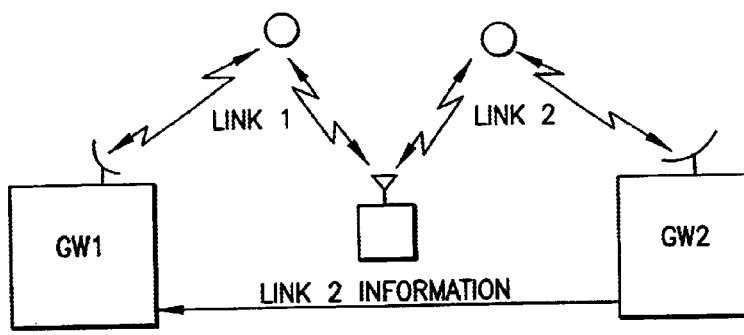
FIG.6B
FIG.7
| | GW3 | | | | | | | | |
|---|---|---|---|---|---|---|---|---|---|
| 1/3 | 3 | 3 | 3 | 3 | 3 | 3 | 3 | 3 | 3 |
| 1/3 | 1/3 | 3 | 3 | 3 | 3 | 3 | 3 | 3 | 3 |
| 1 | 1/3 | 1/3 | 3 | 3 | 3 | 3 | 3 | 3 | 3 |
| 1 | 1 | 1/3 | 3 | 3 | 3 | 3 | 2/3 | 2/3 | 2/3 |
| 1 | 1 | 1 | 1 | 1/2 3 | 1/2 3 | 2/3 | 2/3 | 2/3 | 2/3 |
| 1 | 1 | 1 | 1 | 1/2 | 1/2 3 | 2 | 2 | 2 | 2/3 |
| 1 | 1 | 1 | 1/2 | 1/2 | 2 | 2 | 2 | 2 | 2 |
| 1 | 1 | 1 | 1/2 | 1/2 | 2 | 2 | 2 | 2 | 2 |
| 1 | 1 | 1 | 1/2 | 1/2 | 2 | 2 | 2 | 2 | 2 |
| 1 | 1 | 1 | 1/2 | 1/2 | 2 | 2 | 2 | 2 | 2 |
GW1    GW2

SATELLITE COMMUNICATION SYSTEM PROVIDING MULTI-GATEWAY DIVERSITY TO A MOBILE USER TERMINAL

CROSS-REFERENCE TO RELATED APPLICATIONS

This patent application is related to copending U.S. patent application Ser. No. 08/903,166, filed Jul. 3, 1997, entitled "Multipath Communication System Optimizer", by Robert A. Wiedeman and Paul A. Monte, which is a continuation of U.S. patent application Ser. No. 08/239,750, filed May 9, 1994. The disclosures of these related patent applications is incorporated by reference herein in their entireties.

FIELD OF THE INVENTION

This invention relates generally to satellite-based communications systems and, in particular, to satellite communications systems that employ a constellation of nongeosynchronous orbit (NGSO) satellites, a plurality of user terminals, and a plurality of gateways for interconnecting voice or data calls between individual ones of the user terminals and terrestrial communication networks via one or more satellites of the NGSO constellation.

BACKGROUND OF THE INVENTION

U.S. Pat. No. 5,619,525, "Closed Loop Power Control for Low Earth Orbit Satellite Communication System", by R. A. Wiedeman and M. J. Sites, describes a satellite communication system that employs terrestrial gateways and a constellation of NGSO satellites, such as Low Earth Orbit (LEO) satellites, for linking user terminals to, for example, the Public Switched Telephone Network (PSTN). Each gateway has a gateway coverage or service area and provides services to those user terminals that reside permanently within the service area, or that reside temporarily (roamers) within the service area. The service area is determined by many factors including, satellite footprint, availability, geometry, national borders, etc. A call that arrives at the gateway from the PSTN for a given user terminal is connected to the user terminal via one or more satellites. In like manner a call originated by the user terminal is connected to the PSTN through the gateway and one or more satellites. This system employs a Code Division Multiple Access (CDMA) modulation scheme, or other multiple access schemes, and enables the gateway to set up multiple links to and from the user terminal through two or more satellites using two or more gateway antennas which may be directional or omni-directional. This provides satellite diversity, as the user terminal (and gateway) are enabled to coherently combine two or more received signals, thus mitigating the effects of signal blockage and fading.

Referring to FIG. 1, the above-referenced U.S. patent applications Ser. No. 08/903,166, filed Jul. 3, 1997, and Ser. No. 08/239,750, filed May 9, 1994, generally teach a satellite communications system wherein a gateway (GW) 1 bidirectionally communicates with a user terminal (UT) 3 via one or more NGSO satellites (e.g., SAT 1 and SAT 2). SAT 1 and SAT 2 may be bent pipe repeaters, or may use on-board processing and may contain regenerative repeaters. The gateway 1 is bidirectionally coupled to a terrestrial communications system, such as the Public Switched Telephone Network (PSTN) which can provide either circuit switched or packet switched (e.g., Internet) voice and data access, as well as to a Ground Data Network (GDN) which provides an ability to communicate with a Ground Operations Control Center (GOCC) and other gateways, which are not shown. The gateway 1 includes typically a plurality of directional antennas, e.g., antennas 1A and 1B, while the user terminal 3 includes, typically, an omni-directional antenna 3A. For the case of a voice or data call that is connected to the PSTN the gateway 1 can provide multiple satellite diversity by routing Code Division Multiple Access (CDMA), or other appropriately modulated signals, forward links through both SAT 1 and SAT 2. Each forward link (FL) has a unique spreading code that enables the link to be separately despread, demodulated and combined in the user terminal 3, or other means of separating the received signals, so that they can be combined, may be used. This provides multiple satellite diversity for the user terminal 3, and facilitates overcoming signal blockage and fading conditions that may occur between the user terminal 3 and one or more of the satellites. The user terminal 3 may thus include a multi-finger decorrelator, such as a Rake receiver, or some other suitable receiver capable of discriminating the two or more signals. Two or more fingers of the Rake receiver can be used for receiving forward traffic channels from two or more of the satellites, while another finger can be time multiplexed to receive pilot signals transmitted by the gateway 1 through the different satellites. If available, a plurality of fingers can be used for this purpose. In one embodiment the user terminal derives link quality information from the forward links, such as signal strength, and transmits link quality indications (QIs) back to the gateway 1. In response to the received link quality indications the gateway 1 is enabled to selectively turn links on and off and/or control individual link power for signals transmitted through individual ones of the satellites 1A and 1B.

It would be desirable to extend these teachings so that a user terminal would be enabled to transition from a first gateway coverage area to a second gateway coverage area, during a call, without dropping the call or requiring that the call be somehow switched from the first gateway to the second gateway. For example, it is envisioned that during a call some mobile user terminals, such as those contained within automobiles, trains and aircraft, will cross political and other boundaries that also happen to define boundaries between adjacent gateway service areas.

OBJECTS AND ADVANTAGES OF THE INVENTION

It is a first object and advantage of this invention to provide a satellite communication system that enables a user terminal to simultaneously use satellites that are in view of at least two gateways.

It is another object and advantage of this invention to extend the teachings of the above-referenced U.S. patent applications Ser. No. 08/903,166, filed Jul. 3, 1997, and Ser. No. 08/239,750, filed May 9, 1994, to provide multi-gateway diversity for a user terminal, as well as to provide link control in the multiple satellite diversity case.

It is one further object and advantage of this invention to provide a technique for increasing an effect gateway coverage area.

It is another object and advantage of this invention to provide a satellite communications system that enables a user terminal to transition, during a call that is connected to a first gateway, from the service area of the first gateway to the service area of a second gateway without dropping the call and without requiring that the call be switched from the first gateway to the second gateway. In another implementation, not only the transition from the first gateway to the second gateway is implemented but, in addition, the call input to a first gateway switch is reconfigured so as to begin at the second gateway.

SUMMARY OF THE INVENTION

The foregoing and other problems are overcome and the objects are realized by methods and apparatus in accordance with embodiments of this invention.

In one aspect this invention provides a method for operating a satellite communications system, and a system that operates in accordance with the method.

The method includes steps of (a) establishing a call connection between a terrestrial telecommunications network and a user terminal via a first gateway and at least one satellite; and (b) while the call connection is established, coupling the user terminal to the terrestrial telecommunications network via a second gateway, in which during a period of time (which could be for the length of the call) the user is connected to both gateways, and at least one further satellite. During the coupling step, call speech or data information is conveyed between the first gateway and the second gateway over an inter-gateway communications link, in which during a period of time (which could be for the length of the call) the user is connected to both gateways, and data and/or voice traffic is conducted to the user simultaneous via two gateways.

The step of coupling includes a first step of detecting at the first gateway that the user terminal is capable of communicating with the at least one further satellite that is in view of the second gateway and the user terminal, a second step of negotiating with the second gateway for an assignment of resources to establish a connection with the user terminal, and a third step of bidirectionally coupling the terrestrial telecommunications network to the user terminal through the first gateway, through the second gateway, and through the at least one further satellite using the assigned resources. The at least one further satellite could be the at least one original satellite that is fading from the first gateway but not from the second gateway. The assigned resources in one instance uses the same resources (frequencies, power and other) that are assigned by the first gateway. In another implementation the user links are established at the second gateway with new and possibly unique resources.

The step of bidirectionally coupling can include a step of maintaining the call connection through the at least one satellite, or a step of terminating the call connection through the at least one satellite.

The step of detecting includes steps of generating received signal quality indications in the user terminal for established traffic channels and for pilot channels, and transmitting the quality indications back to the first gateway. A further step selectively controls forward link power and on/off states in accordance with the quality indications received from the user terminal.

Also disclosed is a method for providing a gateway with a larger effective terrestrial coverage area. This method includes steps of (a) providing a first gateway and a second gateway, each gateway having an associated terrestrial coverage area and each gateway being coupled to the same or a different terrestrial telecommunications network. In the case of the same network, the first and second gateways are coupled to the network at two different nodes. A next step (b) establishes a call connection between the terrestrial telecommunications network coupled to the first gateway and a user terminal located in the terrestrial coverage area of the first gateway by coupling the user terminal to the first telecommunications network via at least one satellite that is in view of the first gateway and the user terminal; and (c) while the call connection is established, further coupling the user terminal to the terrestrial telecommunications network via the second gateway and at least one further satellite that is in view of the second gateway and the user terminal. In one implementation the call is connected from the network (e.g., PSTN) to the first gateway and remains so for the duration of the call, in which case the call traffic data is conducted from the first gateway to the second gateway by a further network (which could be the ground data network). In another implementation, the call traffic is transferred to the second gateway during the call, while still maintaining the user connection to both the first and second gateways.

This method includes a further step of maintaining the call connection between the first terrestrial telecommunications network coupled to the first gateway and the user terminal after the user terminal moves from the terrestrial coverage area of the first gateway into the terrestrial coverage area of the second gateway.

The steps of coupling, further coupling, and maintaining each include a step of exchanging call-related data between the first gateway and the second gateway over the intergateway communications link.

In a further aspect of this invention the user can be provided with the "best" quality of service of all satellites in view of both gateways.

In a preferred embodiment the forward and return links between the user terminal and a given gateway are independent, and the gateway diversity could be used on one link and not the other.

BRIEF DESCRIPTION OF THE DRAWINGS

The above set forth and other features of the invention are made more apparent in the ensuing Detailed Description of the Invention when read in conjunction with the attached Drawings, wherein:

FIG. 6A is a block diagram of a first user terminal power control embodiment;

FIG. 6B is a block diagram of a second user terminal power control embodiment;

FIG. 7 is a diagram illustrating a portion of a location grid and a plurality of gateways.

DETAILED DESCRIPTION OF THE INVENTION

A constellation of communications satellites of most interest to this invention is a Non-Geosynchronous Orbit (NGSO) constellation. The NGSO constellation may be a Low Earth Orbit (LEO) or a Medium Earth Orbit (MEO) constellation, or may comprise various High altitude circular or Elliptical Orbits (HEO), or may use orbits such as Loopus, ACE, or Molnya orbits, or any other suitable orbits. The NGSO constellation may thus be in any set of orbit configurations, but generally will use inclined circular orbits or polar orbits. However, constellations of elliptical orbit satellites or combinations of elliptical and circular orbits can be used as well. The orbit of the NGSO constellation thus need not be inclined but may instead be equatorial, polar, or any other configuration, including sun synchronous. Thus, while in the ensuing description the NGSO constellation will be referred to as a LEO constellation using an inclined circular orbit of less than 2000 km, the teachings of this invention are not limited to the use of only this particular type of NGSO constellation.

Suitable, but not limiting, types of LEO satellite systems that can be used to implement the teachings of this invention, when modified as described below, are taught in U.S. Pat. No. 5,619,525, "Closed Loop Power Control for Low Earth Orbit Satellite Communication System", by R. A. Wiedeman and M. J. Sites; U.S. Pat. No. 5,448,623, "Satellite Telecommunications System Using Network Coordinating Gateways Operative with a Terrestrial Communication System", by R. A. Wiedeman and P. A. Monte; and U.S. Pat. No. 5,303,286, "Wireless Telephone/Satellite Roaming System", by R. A. Wiedeman, the teachings of which are incorporated by reference herein in their entireties. The teaching of this invention extends the teachings of the above-referenced U.S. patent applications Ser. No. 08/903,166, filed Jul. 3, 1997, and Ser. No. 08/239,750, filed May 9, 1994, to provide multi-gateway diversity for the user terminal 3, as well as controlled links in the multiple satellite diversity case.

Figure 1:
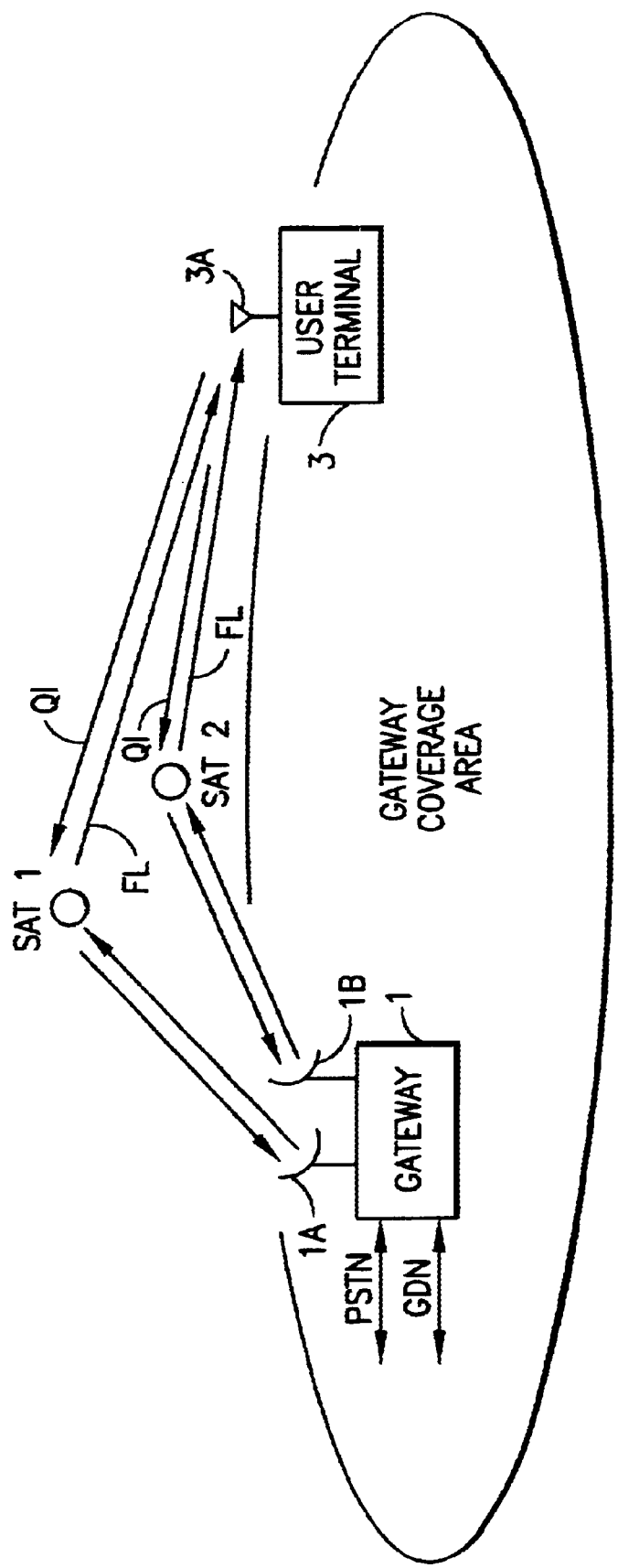
FIG. 1 is diagram that is useful in explaining the teachings of the above-referenced U.S. patent applications Ser. No. 08/903,166, filed Jul. 3, 1997, and Ser. No. 08/239,750, filed May 9, 1994.
Figure 2A:
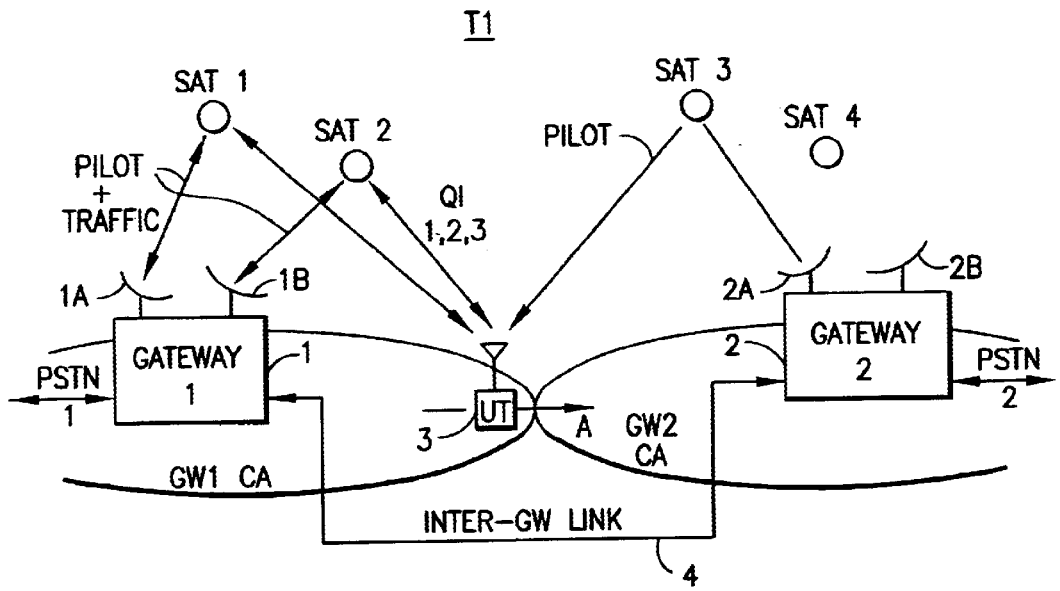
FIGS. 2A, 2B and 2C show the operation of the satellite communication system in accordance with the teaching of this invention at three instances in time as a user terminal transitions from the coverage area of a first gateway to the coverage area of a second gateway.
Figure 2B:
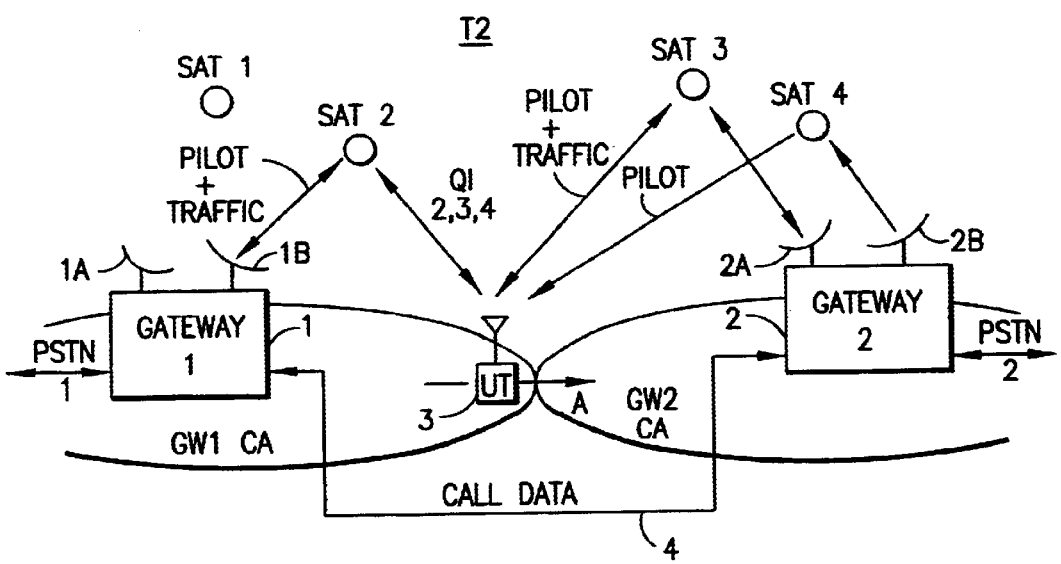
Figure 2C:
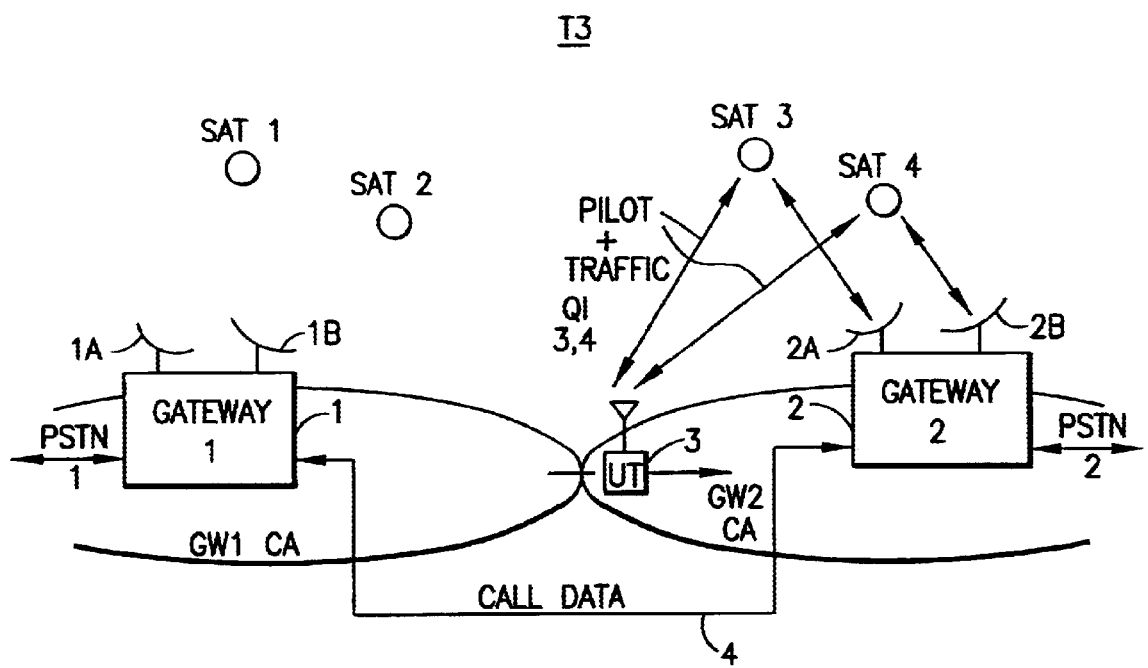
Figure 8:
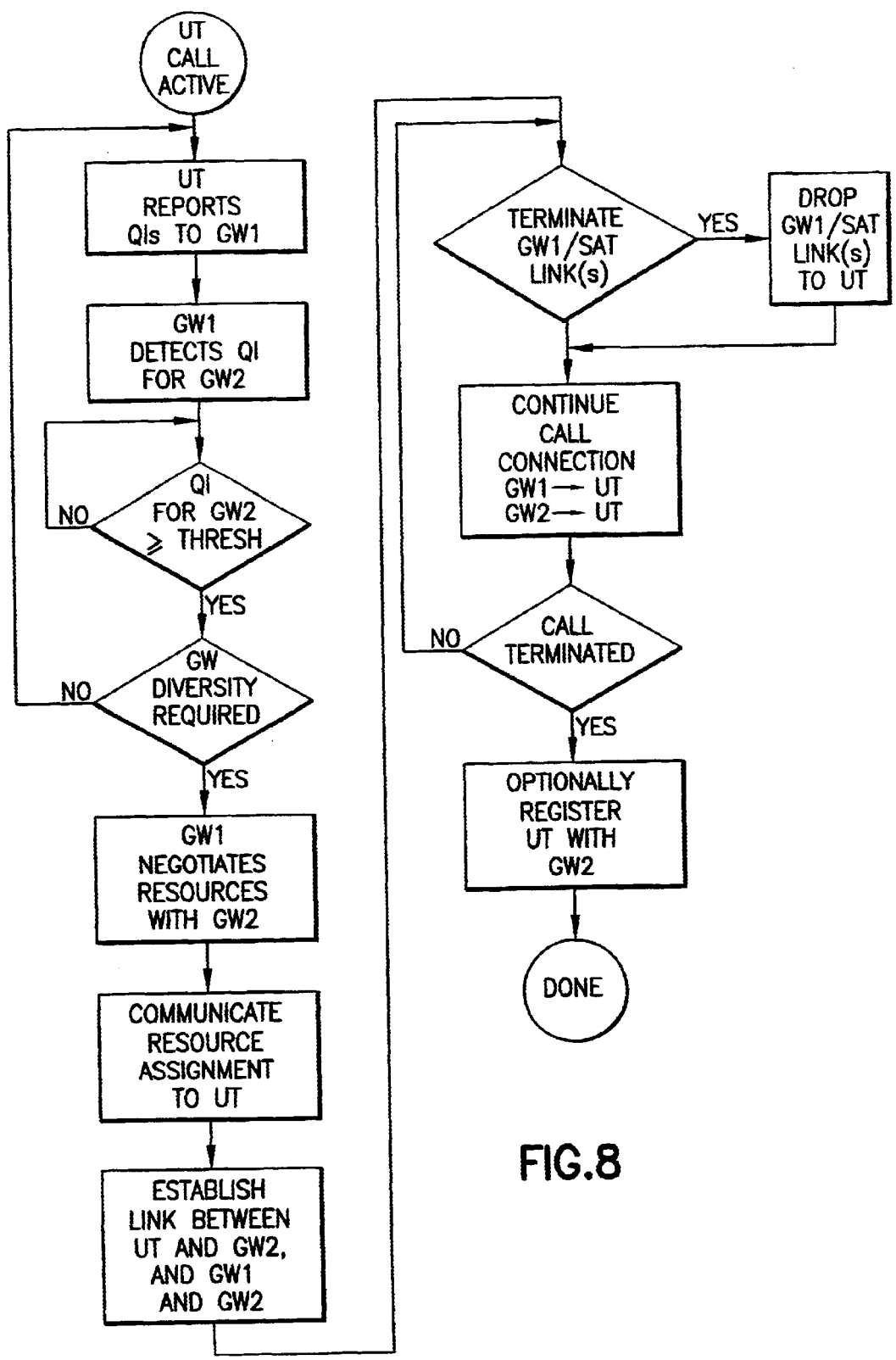
FIG. 8 is a logic flow diagram illustrating a method for the operation of the satellite communication system shown in FIGS. 2A–2C.

Referring to FIGS. 2A–2C, as well as the logic flow diagram of FIG. 8, there is shown the operation of the satellite communication system in accordance with the teaching of this invention at three instances in time as the user terminal 3 transitions from the coverage area (CA) of a first gateway (GW 1) to the coverage area of a second gateway (GW 2).

In FIG. 2A, at time T1, the UT 3 is assumed to be engaged in an active call (voice or data) and may or may not be moving in the direction indicated by the arrow (A). The call is connected from a first PSTN (PSTN-1), through the GW 1, and via forward and reverse links made through both SAT 1 and SAT 2. Each forward link contains a traffic channel and a pilot channel, each of which is identifiable by a unique spreading code or some other means of uniquely identifying the signal. The UT 3 transmits a traffic channel on the reverse link which is received and relayed to GW 1 by both SAT 1 and SAT 2. The UT 3 also transmits link quality indications (QIs) for the received forward traffic links made through SAT 1 (QI-1) and through SAT 2 (QI-2). The GW 1 is responsive to the received QIs for selectively turning these links on or off, and/or adjusting the power of each of the forward traffic links, as described in the above-referenced U.S. patent applications Ser. No. 08/903,166, filed Jul. 3, 1997, and Ser. No. 08/239,750, filed May 9, 1994.

As the UT 3 approaches the coverage area of the second gateway (GW 2), and/or the configuration of the satellites in space changes, it begins to receive a pilot channel transmitted from GW 2 through SAT 3. Because of its location, SAT 3 may not be visible to GW 1. Alternatively, SAT 3 may be visible but at a lower elevation angle and thus at lesser quality than other satellites in view of GW 1. Alternatively, for any of a number of reasons the signal from the UT 3 to GW 2 may be better than the signal paths to GW 1. The UT 3 will determine the strength of the pilot channel received through SAT 3 and report same as a QI-3 back to GW 1. The GW 1 notes that the UT 3 is receiving the pilot channel energy from GW 2, and will begin comparing the QI-3 to the QI-1 and QI-2. At some time QI-3 will indicate a better quality link through SAT 3 than, for example, the link made through SAT 1, or alternatively one of the two or more links from GW 1 may be blocked or shadowed. In any case, at some time the QI for GW 2 exceeds some threshold (THRESH) value.

Referring now to FIG. 2B, and assuming that gateway diversity is selected by the user (as described below) or is otherwise desirable or required, at time T2 the GW 1 communicates with GW 2 through an inter-gateway communications link 4 to inform GW 2 of the presence of the UT 3. GW 1 and GW 2 then negotiate over the inter-gateway communications link 4 to allocate GW 2 resources for the UT 3. This generally involves an assignment to the UT 3 of at least forward and reverse frequency channels, data rate(s) and CDMA spreading codes. The GW 2 resource assignment information is then transmitted from GW 1 to the UT 3 using a predefined signalling protocol, such as one normally used when assigning the UT 3 to a new traffic channel of the GW 1. For the case where the UT 3 has a single satellite transmitter and receiver (transceiver) the frequency channel allocation from GW 2 will match the frequency channel allocation used by GW 1. Some time after the telephony link is established between the UT 3 and GW 2 through SAT 3 the GW 1 begins forwarding the call data (such as vocoded speech or data packets) through the inter-gateway link 4 to GW 2, or by other means, and may then or later terminate the forward and reverse traffic links through SAT 1. GW 2 then begins to transmit the call data to the UT 3. At this time the UT 3 is operating in a multiple gateway and satellite diversity mode (e.g., SATs 1, 2 and 3 or SATs 2 and 3 and GW 1 and GW 2) and coherently combines the transmissions from these satellites and GWs. The reverse link from the UT 3 is made through SAT 3 to GW 2 and then to GW 1 through the inter-gateway communication link 4.

Assuming that the links through SAT 1 have been terminated, the UT 3 continues to determine and transmit the quality information for SATs 2 and 3. This QI information is received by GW 1 and GW 2, and may be acted on only by GW 1. That is, GW 1 can control the forward link made through SAT 2, and will forward the QI information for SAT 3 back to GW 2 so that GW 2 can control the forward link made through SAT 3.

In another embodiment each gateway acts independently by comparing the QI information of the link(s) transmitted through itself with the QI information of the link(s) transmitted through other gateways.

At some future time the UT 3 will begin receiving the pilot channel from SAT 4. The quality information for the pilot channel received through SAT 4 (QI-4) may then be also relayed back to GW 1.

Referring now to FIG. 2C, at time T3 the UT 3 has transitioned from the GW 1 coverage area into the GW 2 coverage area. At a time when the quality information for SAT 4 becomes better than the quality information for SAT 2 the GW 1 also drops the link through SAT 2, after negotiating for additional gateway and satellite resources from GW 2, and setting up a second link through SAT 4 so that the UT 3 is operating in the multiple satellite diversity mode only with GW 2.

It is important to note that at this time the ongoing call is still connected from PSTN-1 to GW 1 and through the inter-gateway communication link 4 to GW 2 and then to the UT 3 via SAT 3 and SAT 4. During this time the GW 1 can retain overall control of the call, or call control can be shifted to GW 2 (e.g., examining and responding to the QI indicators, performing beam-to-beam and satellite-tosatellite handoffs, etc.)

FIGS. 2A–2C show the case where the single UT 3 is moving from the GW 1 CA to the GW 2 CA. However, it should be realized that at any given time a number of user terminals may be moving in the same manner, and a same or like number may be moving from the GW 2 CA to the GW 1 CA.

The power control of the various links can be maintained in several ways. Referring to FIG. 6A, in a first embodiment the UT 3 links are power controlled by the Master Gateway 1, all decisions for GW 2 links are made at GW 1, and all power control signalling is sent via an inter-gateway link.

Referring to FIG. 6B, in a second embodiment the links are power controlled by each participating gateway. In this case information with respect to the link 2 is sent from GW 2 to GW 1 such that, in the case that GW 2 becomes impaired or unusable, communication with another satellite available at GW 1 can be accomplished. As far as the user terminal 3 is concerned, it may control its transmit power by responding only to power control commands received from the master gateway (e.g., GW 1), or by receiving power control commands from all participating gateways and increasing its transmitted power only if all participating gateways request an increase.

When the call is terminated, and if the UT 3 has moved to be within the service area of GW 2, the UT 3 registers with GW 2 in a conventional fashion, the UT 3 home location register (HLR) and any visitor location registers (VLRS) are updated accordingly, and any future incoming or outgoing calls are made through the PSTN-2 that is coupled to GW 2. The same process is followed if the user has transitioned a GW 3 area.

Referring to FIG. 7, a network of three gateways (GW 1, GW 2, GW 3) is shown. On the ground there is a grid of squares (or any shape such as circles or hexagons) each of which represents a geographic location on the earth. It is possible to place the UT 3 within any of these squares on the grid, and to then couple the UT 3 to one or more gateways by simulating the links while moving the satellites in orbit over the GW's and the grid. By then simulating various blocking profiles, a computer map can be generated, which for any arbitrary quality of availability (i.e. 98% probability of completing a call of three minutes) a preferred and probable likelihood of the best set of GWs to use can be determined and stored in a map within the GW 1, GW 2 and GW 3 database. In FIG. 7 this is denoted by 1, 2, 3 for use of only GWs 1, 2 and 3, respectively, or by ½, 1/3/ or ⅔ which notes that GWs 1 and 2 should be available or GWs 1 and 3 etc. In this manner it is possible to predictively determine, depending on the UT 3 location, that two or more GWs may be used to initially set up the call. Likewise, this stored map within the GWs can be used to predict needed resources for a UT moving between GWs.

For a call to the UT 3, the call is received at the current registered GW (e.g., GW 1). If the last location of the UT 3 was known to be in an area that is shared between different gateway(s), the registered GW sends a message to the other gateway(s) to page the UT 3. If the registered GW receives the UT 3 response on the reverse link, the registered GW sets up the call. If another GW receives the UT 3 response, a registration is first performed to register the UT 3 so that the new GW can set up the call.

For a call from the UT 3, if the registered GW receives the UT 3 call request, the registered GW sets up the call. If another GW receives the UT 3 request, a registration is first performed to register the UT 3 to the new GW, and then the new GW sets up the call.

Figure 3:
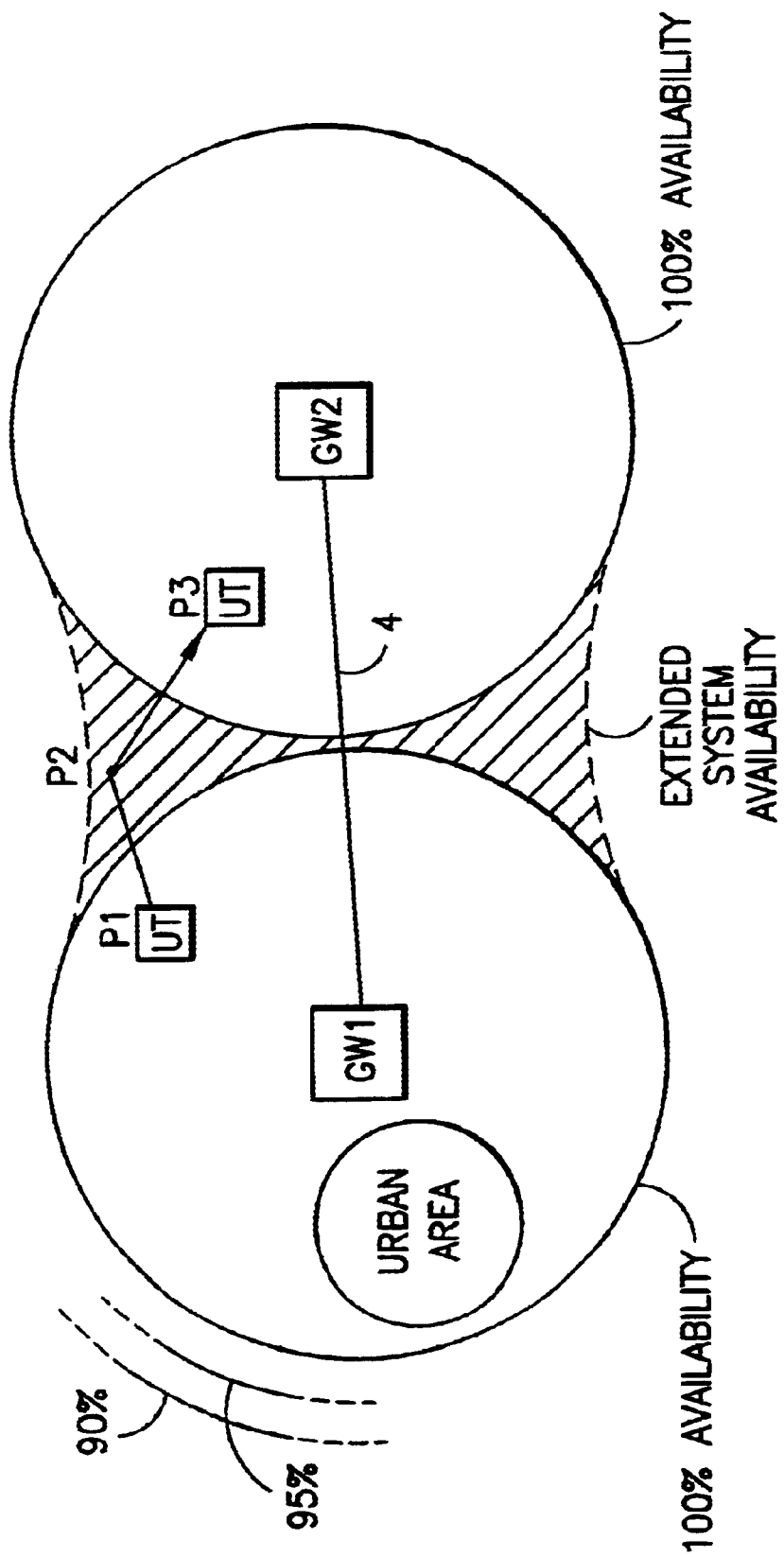
FIG. 3 is a diagram that is useful in explaining an increase in the effective gateway coverage area that is a feature of this invention.

FIG. 3 depicts an increase in the effective gateway coverage area that is a feature of this invention. Each system gateway can be considered to be surrounded by nominally concentric lines such as circles (or any other shape) that bound system availability regions. For example, when located within the inner circle (and not blocked by some RF shielding obstruction such as a tunnel) a user terminal is guaranteed that the satellite communication system is available 100% of the time. When located within the region between the inner circle and the next adjacent circle the system is available 95% of the time, etc. The extent of the availability regions are determined in part by the satellites that can be viewed from the gateway and the user temrinal, in particular those satellites that lie within some predetermined range of elevation angles, such as above 10° from the horizon. While described below in the context of mobile UTs, it should be realized that these teachings apply as well to temporarily stationary UTs as well to fixed UTs.

In accordance with this invention the effective gateway coverage region, in particular the effective system availability region, is extended since both gateways 1 and 2 can participate, each using one or more satellites that are in view of the particular gateway and the user terminal, and that may not be in view of the other gateway. For example, consider the user terminal 3 that begins a call at position one (P1), then moves to P2, and that then moves to P3 and terminates the call.

Under conventional practice the user terminal would exit the region of 100% system availability when moving to P2, and would exit completely the coverage area of GW 1 when moving to P3. However, in accordance with this invention the user terminal 3 instead at all times experiences improved system availability due to the extended effective gateway coverage area made possible by the multi-gateway diversity transmission and reception technique of this invention.

It is noted that the UT 3 could also remain stationary, either temporarily or permanently, at P2, and then switch to gateway 2, and possibly back again to gateway 1, as a function of satellite availability at the P2 location.

It should be further noted that the shapes of the coverage regions shown in FIG. 3 are exemplary and idealized, and in practice may have other shapes based on, for example, the local terrain and/or the latitude at which the gateways are located.

Figure 4:
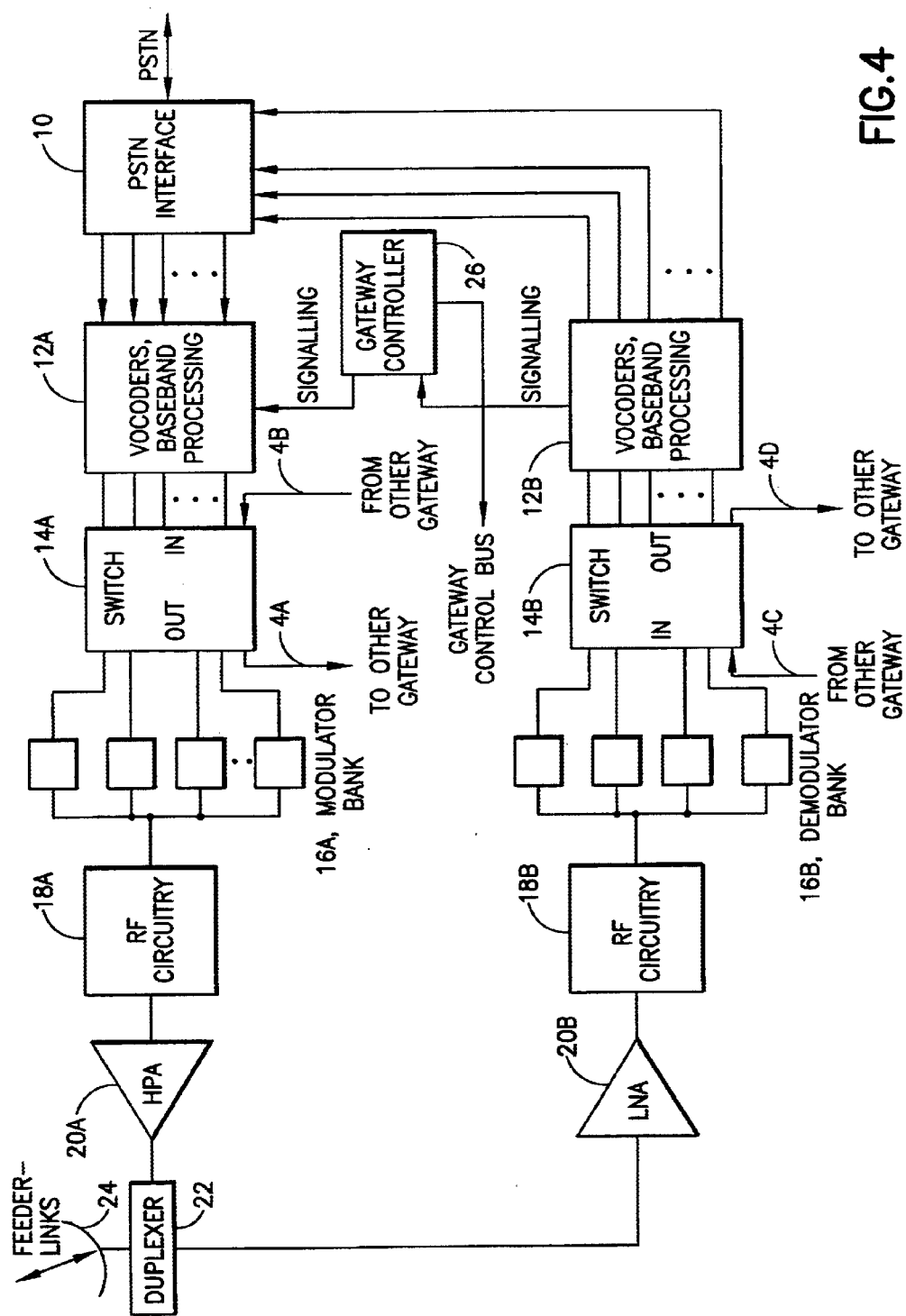
FIG. 4. is a simplified block diagram of one embodiment of a gateway showing the origin and termination of inter-gateway signal paths in accordance with an aspect of this invention.

FIG. 4 is a simplified block diagram of one embodiment of a gateway showing the origin and termination of the inter-gateway signal paths 4 in accordance with an aspect of this invention. Another, unillustrated, embodiment would switch the call from one gateway to another.

In FIG. 4 the gateway, such as the GW 1 of FIG. 2, includes a terrestrial telecommunications network interface, such as a PSTN interface block 10 that is bidirectionally coupled to the analog or digital telephone trunk lines of the local PSTN (or to a private telephone network) or to the Internet. The PSTN interface 10, which may include a switch or an Internet connection, has outputs connected to a baseband processing block 12A that includes a bank of voice coders (vocoders), and which in turn is connected to a switching block 14A. A given vocoder is used to compress a digital representation of a speech signal received from the PSTN, and is bypassed if a data signal is received from the PSTN (e.g., a facsimile signal or packetized data from an Internet server). Outputs of the switching block 14A are selectively coupled to a bank of signal modulators 16A where CDMA signal spreading is performed. The modulators 16A output modulated signals to an RF transmit circuitry block 18A where the signals are combined and upconverted to a transmission frequency before being applied to a high power amplifier (HPA) 20A. The output of the HPA 20A is applied through a duplexer 22 to the gateway directional antenna 24 and is transmitted as a feeder uplink (e.g., C-band or Ku-band) to one of the satellites that is in view of the gateway 1.

On the reception side a feeder downlink from the same satellite is applied through the duplexer 22 to a low noise amplifier (LNA) 20B and then to a receiver RF circuitry block 18B. The output of the RF circuitry block 18B is applied to a bank of demodulators 16B, including signal despreaders, and the individual despread signals are then applied through switching block 14B to a baseband processing block 12B that includes a bank of voice decoders (which are bypassed for data signals). The recovered speech signals from each of the user terminals serviced by the particular satellite presently pointed at by the directional antenna 24 are then applied to the PSTN interface 10 and connected to the appropriate telephone line, enabling full duplex voice or data calls to occur.

A gateway controller 26 operates to control the gateway circuitry, to set up signal paths using the switching blocks 12A and 12B, to bypass vocoders as required, and to control the generation and interpretation of signalling messages transmitted to and received from the user terminals. This control function includes interpreting the QI signals and controlling the forward link through the satellite accordingly.

In accordance with an embodiment of this invention, the inter-gateway link 4 originates and terminates at the switching blocks 14A and 14B. Referring first to switching block 14A, the baseband voice or data coming from the PSTN for the user terminal is routed to an output of the switching block 14A that is connected to the inter-gateway link 4 and is thus routed on line 4A to the second gateway. The data is received at the other gateway switching block 14A and is then applied to one of the modulators as if the input came from the gateway's own block of vocoders. In this manner the baseband voice or data information is treated in the other gateway as though it were received from the local PSTN (or private network), and is then applied to a selected one of the modulators in the modulator bank 16A. On the receive side the output from the switching block 14B, coming from one of the demodulators 16B, is routed to the inter-gateway link 4 on output line 4D, and demodulated signals from the other gateway are applied to the input to the switching block 14B through input line 4C. In this manner the baseband voice or data information is treated in the other gateway as though it were received from the antenna 24, and is selectively applied to one of the vocoders (for speech), and other baseband processing is performed as required before the signal is output to the local PSTN (or private network).

By example, and for the case shown in FIG. 2B, in GW 1 a PSTN speech input for the UT 3 is received, digitized and vocoded, and is then applied on line 4A to the GW 2, where it is received on input line 4B, applied to the input of the switching block 14A, and then used to modulate a carrier before being uplinked to SAT 3. A speech signal received from the UT 3 through SAT 3 is demodulated in GW 2 and applied through inter-gateway link line 4D to the GW 1, where it is received on line 4C, and applied to the PSTN via switching block 14B and the baseband processing and voice decoding block 12B.

It should be realized that the switching and inter-gateway link coupling arrangement shown in FIG. 4 is exemplary, and that other configurations could be used. For example, a separate switching block could be connected between the output of the modulator bank 16A and the input of the RF circuitry block 18A, and a corresponding switching block could be used between the output of the RF circuitry 18B and the inputs to the demodulator bank 16B, with the intergateway link 4 being connected at these points in a manner shown in FIG. 4. Diversity combining can be done in one of the gateways, or in both.

In accordance with an aspect of this invention the inter-gateway communications link 4 can convey baseband (digital) call data between the gateways, or it can convey RF call data.

It was previously described in reference to FIGS. 2A–2C that the GW 1 was responsible for interpreting the QI indicators received from the UT 3, and then informing GW 2 of the result. It should be realized that the gateway controller 26 of GW 2 may examine the incoming QI indicators and respond to only those QI indicators that correspond to the SATs 3 and/or 4, while forwarding the QI indicators for SATS 1 and/or 2 over the inter-gateway link 4 to the GW 1 for processing.

As was described previously, one gateway (i.e., the Master GW) can be responsible for power controlling the UT 3, or each gateway may be responsible for the power control of any UT to which it is coupled, and may thus send power control bits as required to control the UT transmitter power. In this latter case, the UT 3, if receiving conflicting power control commands, can operate so as to minimize a possibility of creating interference for other user terminals, such as by selecting the power control command that results in the least transmitted power, or by making a power control adjustment only if commanded to do so by each gateway. Alternatively, one of the GWs (e.g., GW 1 in FIGS. 2A–2C) can serve as the UT power controller, and may thus receive UT signal strength measurements from the other gateway. In this case the single power-controlling gateway is responsible for generating power control commands that satisfy, if possible, the minimum link requirements for both serving gateways.

The invention has been described thus far for the case of two gateways. However, and referring to FIG. 5, it should be realized that more than two gateways can be interconnected and operated as described above for providing an even larger effective coverage area. For example, GW 1 may be located in South America, GW 2 in North America, GW 3 in North Africa, and GW 4 in Northern Europe. In this case a given UT that is aboard an aircraft may originate a call at position P1, and terminate the call at position P2, all the while being connected to the PSTN-1 at GW 1. When transitioning from the coverage area of GW 3 to the coverage area of GW 4 the same procedure as described in FIGS. 2A–2C is performed by the GW 1 for negotiating the allocation of gateway and satellite resources for the UT. The inter-gateway links 4 may be made as shown for fully interconnecting the gateways, or each gateway may be connected only to its adjacent gateways (e.g., GW 1 connected only to GWs 2 and 3), with longer links being relayed through intervening gateways (e.g., GW 4 to GW 1 via GW 2 or GW 3). The inter-gateway links 4 need not be a separate communication path, but could form a part of the Ground Data Network (GDN) that interconnects all of the gateways to the Ground Operations Control Center (GOCC). Alternatively, the inter-gateway links 4 could be conveyed in whole or in part through the satellites of the communications constellation, or through some other satellite(s) altogether.

Figure 5:
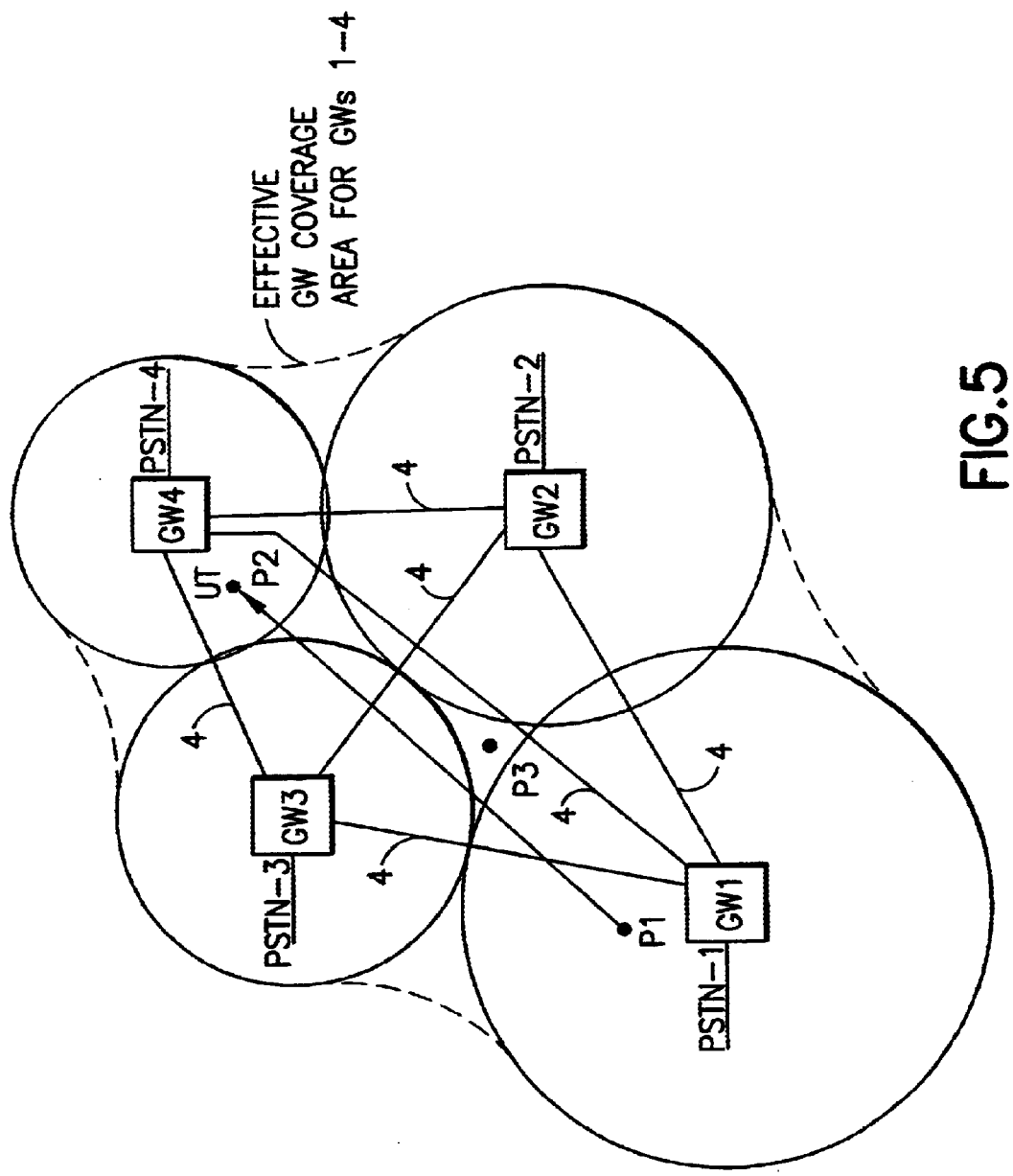
FIG. 5 depicts a case where more than two gateways are interconnected so as to have an increased effective coverage area.

It is also within the scope of this invention to simultaneously maintain a call through three or more gateways, such as GW 1, GW 2 and GW 3 for a UT located at position P3 in FIG. 5. As before, a single PSTN connection is maintained through one of the gateways (the primary gateway), and call information is exchanged over the inter-gateway communication links 4. In this case multiple lines 4A–4D (FIG. 4) are provided at the primary gateway for connecting to the other gateways or can be communicated through the satellite or other satellites.

It should be noted that the use of the inter-gateway communication links 4 and the multi-gateway diversity in accordance with this invention need not be applied in all cases. For example, the ability to transition between gateway coverage areas as described above may be a value-added feature that is either selected or not selected by a given user, either at the time the user's account and profile is established or on a call-by-call basis. For example, when about to transition out of a gateway's coverage area during a call the serving gateway may send a message to the UT that is displayed to the user, the message giving the user the option to take advantage of the ability to continue the call even after leaving the gateway's coverage area. By depressing a predetermined user terminal key during the call the appropriate signalling is sent back to the serving gateway for indicating the user's preference.

As was mentioned above, a gateway may use the multiple gateway diversity feature for user terminals that are stationary or fixed, or for those that are not transitioning between gateway coverage areas. By example, and referring again to FIG. 3, assume that the GW 1 is servicing the UT at position P1 near to the boundary with the GW 2 coverage area, and that an actual or predicted increase in user demand occurs for a region designated as an urban area, or assume that weather conditions or a disaster in the urban area result in more satellite power being required to service the user terminals located there. In this case the GW 1 may negotiate with GW 2 to use one or more less heavily loaded satellites that are visible to both GW 2 and the UT, thereby increasing capacity in the GW 1 service area. This arrangement may remain in effect for a portion of the on-going call, until the end of the ongoing call, or over several consecutive calls, depending on the needs of GW 1 and the ability of GW 2 to accommodate the additional load represented by the UT in the GW 1 coverage area.

A gateway may also use the multiple gateway diversity feature for UTs beyond the 100% coverage region for the gateway.

It should thus be realized that while the invention has been particularly shown and described with respect to preferred embodiments thereof, changes in form and details may be made without departing from the scope and spirit of the invention.

What is claimed is:

1. A method for operating a satellite communication system comprising a plurality of terrestrial gateways, at least one user terminal, and a plurality of satellites forming a constellation of non-geosynchronous satellites, comprising steps of:

establishing a call connection between a terrestrial telecommunications network and a user terminal via a first gateway and at least one satellite; and while the call connection is established, coupling the user terminal to the terrestrial telecommunications network via a second gateway, a inter-gateway communications link, the first gateway, and through the at least one satellite or through at least one further satellite;

wherein the step of coupling includes communicating call-related information between the first gateway and the second gateway through the inter-gateway communications link;

wherein the inter-gateway communications link bidirectionally couples the first gateway to the second gateway without passing through any of the satellites of the constellation of satellites.

2. A method as in claim 1, wherein the step of coupling includes a step of conveying call speech or data information between the first gateway and the second gateway.

3. A method as in claim 1, wherein the step of coupling includes steps of:

detecting at the first gateway that the user terminal is capable of communicating through the at least one satellite or through the at least one further satellite that is in view of the second gateway and the user terminal;

negotiating with the second gateway for an assignment of resources to establish a connection with the user terminal; and bidirectionally coupling the terrestrial telecommunications network to the user terminal through the first gateway, through the second gateway, and through the at least one satellite or through the at least one further satellite using the assigned resources.

4. A method as in claim 3, wherein the step of bidirectionally coupling includes a step of maintaining the call connection through the at least one satellite.

5. A method as in claim 3, wherein the step of bidirectionally coupling includes a step of terminating the call connection through the at least one satellite.

6. A method as in claim 3, wherein the step of detecting includes steps of:

generating received signal quality indications in the user terminal for established traffic channels and for pilot channels; and transmitting the quality indications back to the first gateway.

7. A method as in claim 6, and further comprising a step of selectively controlling forward link power and on/off states in accordance with the quality indications received from the user terminal.

8. A satellite communication system comprising a plurality of terrestrial gateways, at least one user terminal, and a plurality of satellites forming a constellation of non-geosynchronous satellites, said system further comprising:

circuitry in a first gateway for bidirectionally coupling said first gateway to a first terrestrial telecommunications network and circuitry for bidirectionally coupling said at least one user terminal to said first terrestrial telecommunications network through at least one satellite of said constellation of satellites;

an inter-gateway communications link bidirectionally coupled between said first gateway and a second gateway without passing through any of said satellites of said constellation of satellites; and further circuitry in said first gateway, coupled to said inter-gateway communications link, for coupling said at least one user terminal to said first terrestrial telecommunications network via said first gateway, said inter-gateway communications link, said second gateway and through said at least one satellite or through at least one further satellite of said constellation of satellites;

wherein said inter-gateway communications link communicates call-related information between said first gateway and said second gateway.

9. A system as in claim 8, wherein said inter-gateway communication link conveys call speech or data information, and call signaling information, between the first gateway and the second gateway.

10. A system as in claim 8, wherein said first gateway further comprises:

means for detecting, based on signaling information received from said user terminal, that said user terminal is capable of communicating with said at least one first satellite or said at least one further satellite that is in view of said second gateway and said user terminal;

a controller for negotiating with said second gateway over said inter-gateway communications link for an assignment of resources to establish a call connection with said user terminal; and circuitry for bidirectionally coupling said first terrestrial telecommunications network to said user terminal through said first gateway, through said inter-gateway telecommunications link, through said second gateway, and through said at least one first satellite or said at least one further satellite using the assigned resources.

11. A system as in claim 10, wherein said first gateway maintains the call connection through said at least one satellite after said user terminal is coupled to said first terrestrial telecommunications network through said first gateway, through said inter-gateway telecommunications link, through said second gateway, and through said at least one first satellite or said at least one further satellite.

12. A system as in claim 10, wherein said first gateway terminates the call connection through said at least one satellite after said user terminal is coupled to said first terrestrial telecommunications network through said first gateway, through said inter-gateway telecommunications link, through said second gateway, and through said at least one first satellite or said at least one further satellite.

13. A system as in claim 10, wherein said means for detecting is comprised of:

means in said user terminal for generating received signal quality indications for established traffic channels and for pilot channels; and means for transmitting the quality indications back to said first gateway either directly or through said second gateway and said inter-gateway communications link.

14. A system as in claim 13, and further comprising means in said first gateway and said second gateway for selectively controlling forward link power and on/off states in accordance with the quality indications received from said user terminal.

15. In a satellite communications system comprising a plurality of gateways and a plurality of satellites forming a constellation of non-geosynchronous satellites, a method for providing a gateway with a larger effective terrestrial coverage area, comprising steps of:

providing a first gateway and a second gateway, each gateway having an associated terrestrial coverage area and each gateway being coupled to a different terrestrial telecommunications network;

providing an inter-gateway communications link bidirectionally coupled between said first gateway and said second gateway, said inter-gateway communications link being provided so that it does not pass through any of said satellites of said constellation of satellites;

establishing a call connection between a first terrestrial telecommunications network coupled to the first gateway and a user terminal located in the terrestrial coverage area of the first gateway by coupling the user terminal to the first telecommunications network via at least one satellite that is in view of the first gateway and the user terminal; and while the call connection is established, further coupling the user terminal to the first terrestrial telecommunications network via the second gateway, the at least one satellite or at least one further satellite that is in view of the second gateway and the user terminal, an inter-gateway communications link and the first gateway, said step of further coupling comprising a step of exchanging call-related data between the first gateway and the second gateway over said inter-gateway communications link.

16. A method as in claim 15, and further comprising a step of maintaining the call connection between the first terrestrial telecommunications network coupled to the first gateway and the user terminal after the user terminal moves from the terrestrial coverage area of the first gateway into the terrestrial coverage area of the second gateway.

17. A method as in claim 16, wherein the steps of coupling and maintaining each include a step of exchanging call-related data between the first gateway and the second gateway over said inter-gateway communications link.

18. A method for operating a satellite communication system comprising a plurality of gateways, at least one user terminal, and a plurality of satellites forming a constellation of non-geosynchronous satellites, comprising steps of:

establishing a call connection between a terrestrial telecommunications network and the user terminal via a first gateway and at least one satellite; and while the call connection is established, communicating call-related information between the first gateway and a second gateway through an inter-gateway communications link that bidirectionally couples the first gateway to the second gateway without passing through any of the satellites of the constellation of satellites for coupling the user terminal to the terrestrial telecommunications network via the second gateway, the inter-gateway communications link, the first gateway, and through the at least one satellite or through at least one further satellite, wherein the step of coupling is performed in response to the at least one satellite or the at least one further satellite exhibiting a better signal quality, relative to the user terminal, than a signal quality obtained using the at least one satellite and the first gateway;

wherein the step of coupling includes a step of conveying call speech or data information between the first gateway and the second gateway.

19. A method as in claim 18, wherein the step of coupling includes steps of:

detecting at the first gateway that the user terminal obtains a better signal quality using the at least one satellite or the at least one further satellite that is in view of the second gateway and the user terminal;

negotiating with the second gateway for an assignment of resources to establish a connection with the user terminal; and bidirectionally coupling the terrestrial telecommunications network to the user terminal through the first gateway, through the second gateway, and through the at least one satellite or through the at least one further satellite using the assigned resources.

20. A method as in claim 19, wherein the step of bidirectionally coupling includes a step of maintaining the call connection through the at least one satellite.

21. A method as in claim 19, wherein the step of bidirectionally coupling includes a step of terminating the call connection through the at least one satellite.

22. A method as in claim 19, wherein the step of detecting includes steps of:

generating received signal quality indications in the user terminal for established traffic channels and for pilot channels; and transmitting the quality indications back to the first gateway.

23. A method as in claim 22, and further comprising a step of selectively controlling forward link power and on/off states in accordance with the quality indications received from the user terminal.

* * * * *